United States Patent [19]

Yoshida et al.

[11] 3,963,676

[45] June 15, 1976

[54] NOVEL PROCESS FOR PREPARING OXYMETHYLENE POLYMER AND RESULTING PRODUCT

[75] Inventors: Masaru Yoshida; Yoshiaki Nakase; Akihiko Ito, all of Takasaki, Japan

[73] Assignee: Japan Atomic Energy Research Institute, Japan

[22] Filed: July 18, 1974

[21] Appl. No.: 489,548

Related U.S. Application Data

[60] Division of Ser. No. 315,792, Dec. 18, 1972, Continuation-in-part of Ser. No. 144,636, May 18, 1971, Pat. No. 3,719,637.

[30] Foreign Application Priority Data

May 20, 1970 Japan.............................. 45-42381
July 4, 1970 Japan.............................. 45-58143

[52] U.S. Cl. ..................... 260/67 FP; 204/159.21
[51] Int. Cl.² ..................... C08G 2/10; C08G 2/02
[58] Field of Search ............. 260/67 FP; 204/159.21

[56] References Cited

UNITED STATES PATENTS

| | | | |
|---|---|---|---|
| 3,379,655 | 4/1968 | May et al. | 260/67 FP X |
| 3,422,035 | 1/1969 | May et al. | 260/67 FP X |
| 3,457,226 | 7/1969 | Miyake et al. | 260/67 FP |
| 3,616,368 | 10/1971 | Ishigaki et al. | 204/159.21 |
| 3,705,876 | 12/1972 | Amann et al. | 260/67 FP |

*Primary Examiner*—Lucille M. Phynes
*Attorney, Agent, or Firm*—Stevens, Davis, Miller & Mosher

[57] ABSTRACT

Tetraoxane is polymerized by means of an electron acceptor substance used as polymerization initiator in the absence or presence of a saturated aliphatic carboxylic acid anhydride and/or an acetal, to obtain an oxymethylene polymer having thermal stability.

An ionizing radiation or a light can, if desired, concomitantly be employed before and/or in the course of polymerization.

7 Claims, No Drawings

NOVEL PROCESS FOR PREPARING OXYMETHYLENE POLYMER AND RESULTING PRODUCT

CROSS REFERENCE TO THE COPENDING APPLICATION

This is a division of application Ser. No. 315,792, filed Dec. 18, 1972.

This is a continuation-in-part to the Patent Application, entitled as "Process for Polymerizing Tetraoxane", Ser. No. 144,636 filed on May 18, 1971, now U.S. Pat. No. 3,719,637.

BACKGROUND OF THE INVENTION

It is well known that oxymethylene polymers can be obtained by polymerizing formaldehyde, trioxane or tetraoxane. However, the polymers thus obtained are inadequate in chemical and thermal stability and are easily depolymerized to formaldehyde. Therefore, these polymers require some stabilization treatment in order that they may be commercially practicable. According to one conventional process, a produced oxymethylene polymer is further treated with a carboxylic acid anhydride to be stabilized, but this process is disadvantageous in that many steps are required for the post-treatment. In another process, formaldehyde is polymerized in the presence of an anhydride of a carboxylic acid, but this process is disadvantageous in that the formaldehyde monomer must be highly purified before the polymerization in order to obtain a satisfactory result.

It is known that tetraoxane is polymerized in the presence of a catalyst such as $BF_3$ (U.S. Pat. No. 3,457,226), but it is disadvantageous in that care must be taken in handling such a very reactive catalyst; in addition, such catalyst remaining in the product polymer has to be neutralized after polymerization is completed.

It is also known that trioxane is polymerized in the presence of an anhydride of aliphatic carboxylic acids by means of an ionizing radiation (Japanese Patent Publication No. 26594/1963). In this process, the anhydride only serves to enhance the polymerization rate of the unpurified trioxane and the thermal stability of the resulting polymer is not improved. Japanese Patent Publication No. 20309/1968 discloses a process for copolymerizing trioxane and itaconic anhydride in the presence of a peroxide catalyst; however, the resultant polymer lacks the properties required for an oxymethylene polymer. According to the process disclosed in Japanese Patent Publication No. 15629/1967, a somewhat thermally stabilized oxymethylene polymer is obtained by polymerizing trioxane and itaconic anhydride by means of an ionizing radiation, but the process is disadvantageous in that the polymerization rate is too slow. U.S. Pat. No. 3,346,663 discloses a process for polymerizing trioxane with an anhydride of organic acids in the presence of Lewis acids or Friedel-Crafts catalysts. However, the molecular weight of the polymer is so low that the polymer is not adequate for practical use when an anhydride of organic acids is added to obtain a polymer having good heat stability.

The foregoing demerits in the prior art have been solved by the present invention, whereby thermally stabilized oxymethylene polymers are obtained with greater ease and in higher yield than when trioxane is polymerized, by polymerizing tetraoxane by means of a specific polymerization initiator. Incidentally, it is to be noted that a process for polymerizing trioxane can not always be applied to a process for polymerizing tetraoxane, since the reactivity of trioxane in the polymerization reaction differs from that of tetraoxane as described for example in U.S. Pat. No. 3,457,226; French Patent No. 1,424,655; J. Polymer Sci., B6, 727 (1964) and the like.

A process for polymerizing a cyclic ether in the presence of maleic anhydride by means of an ionizing radiation or a radical initiator is disclosed in Japanese Patent Publication No. 8829/1968, the examples of which employ 3,3-bis-chloromethyl-oxetane or mixture thereof with trioxane. However, the resultant polymers have no thermal stability.

It should be noted that trioxane can not be polymerized by using an electron acceptor compound as the polymerization initiator.

SUMMARY OF THE INVENTION

An object of this invention is to provide a novel process for preparing an oxymethylene polymer which comprises polymerizing tetraoxane by means of an electron acceptor substance used as a polymerization initiator in the absence or presence of the additives such as a saturated aliphatic carboxylic acid anhydride and/or an acetal. Another object of this invention is to provide a novel heat-stabilized oxymethylene polymer thus obtained. The other objects of this invention will become apparent in the following descriptions.

The process of this invention, if desired, can be carried out by the concomitant use of the initiator and an ionizing radiation or an ultraviolet light in advance of and/or in the course of polymerization.

In the radiation-induced polymerization of tetraoxane, no polymer was obtained in the molten phase or in solution (J. Polymer Sci. B1, 427 (1963)). However, in the case of the concomitant use, the polymerization is also carried out in liquid state. The concomitant use brings about a synergistic effect on the rate of polymerization. In other words, the rate is much higher in the case of concomitant use than the sum of the rates where the initiator and radiation are applied in separate process. Therefore, the effect of ionizing radiation in the presence of the initiators in this invention is essentially different from that of the known use of radiation.

The electron acceptors to be employed in this invention are substantially neutral and typically include quinones (e.g., benzoquinone, p-chloroanil, etc.), nitriles (e.g., tetracyanoethylene, etc.), nitro-compounds (e.g., tetranitromethane, nitrobenzene, m-dinitrobenzene, 1,3,5-trinitrobenzene, diphenylpicrylhydrazil, etc.), nitrogen-oxides (e.g., nitrous oxide, nitrogen monooxide, nitrogen dioxide, etc.) and sulfur hexafluoride. The electron acceptors also include an organic unsaturated carboxylic acid anhydride having a hyperconjugated double bond (which means an organic unsaturated carboxylic acid anhydride having an ethylenic double bond attached to at least one α-carbon), such as maleic anhydride, itaconic anhydride, citraconic anhydride etc. However, these unsaturated anhydrides are sensible to light or a radical initiator and may be polymerized to some extent. It is not advisable to employ these anhydrides concomitantly with light or a radical polymerization initiator.

These additives serve to enhance the heat stability of the resulting polymer and in some cases to increase polymerization rate.

The saturated aliphatic carboxylic acid anhydrides to be employed as the additive preferably have aliphatic group of $C_1 \sim$ about $C_{10}$ and typically include acetic anhydride, propionic anhydride, butyric anhydride, succinic anhydride, etc.

The acetals to be employed as the additive in this invention are a cyclic acetal which excludes tetraoxane and trioxane, and an acyclic acetal. The cyclic acetal and acyclic acetal are represented by the following formulas (I) and (II) respectively:

wherein Q is a member selected from the group consisting of an unsubstituted or substituted aliphatic hydrocarbon residue having 2 to 10 carbon atoms and an unsubstituted or substituted aliphatic hydrocarbon residue containing C-O-C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms;

wherein $R^3$ and $R^5$ each are members selected from the group consisting of an aliphatic hydrocarbon residue having 1 to 4 carbon atoms and a substituted aliphatic hydrocarbon residue having 1 to 8 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms.

The acetals typically include consisting of dimethoxymethane (methylal), diethoxymethane (ethylal), 1,1-dimethoxyethane, 1,1-diethoxyethane, 1,1-diethoxypropane, dipropoxymethane, dibutoxymethane, methoxybutoxymethane, 1,1-dibutoxypropane, 1,1-diethoxybutane, 2,2-dimethoxypropane, 1,3-dioxolane, 1,3-dioxane, 1,3-dioxepane, 1,3-dioxecane, 1,3,5-trioxepane, 1,3,6-trioxocane, 4-methyl-1,3-dioxolane, 4-phenyl-1,3-dioxane, 5-ethyl-4-phenyl-1,3-dioxane, 4-methyl-4-phenyl-1,3-dioxane, 2-methyl-4-methylene-1,3-dioxolane, 1,3-dioxep-5-ene, 1,3-dioxen-6-ene, 5-ethyl-1,3-dioxep-5-ene, and 2-isopropyl-1,3-dioxep-5-ene.

DESCRIPTION OF THE PREFERRED EMBODIMENTS

In accordance with this invention, polymerization can be carried out as follows:

At least one species each of the initiator and if desired at least one species of the additive are added to tetraoxane. When the compound to be added is rather volatile, the polymerization system is confined in a sealed vessel. In the case of solid phase polymerization, the initiator and if desired the additive can be added to crystalline tetraoxane in the form of drops, spray or vapor, and if necessary then melt-mixed with tetraoxane and solidified. In liquid phase polymerization, they can be added to the liquid phase containing tetraoxane, or mixed with crystalline tetraoxane and then melted or dissolved into a solution. The initiator and the additive can be added to tetraoxane simultaneously or separately by various ways. When two or more species of polymerization initiators or the additive are used, the order of addition, if necessary, may be determined by one skilled in the art according to the natures of the compounds to be added.

The amount of initiator to be added depends on the species thereof, but is generally about $10^{-5} \sim 70\%$ by weight, preferably about $10^{-3} \sim 10\%$ by weight of tetraoxane. The amount of saturated carboxylic acid anhydride is about $10^{-3} \sim 15\%$ by weight, preferably about $10^{-2} \sim 5\%$ by weight of tetraoxane. The amount of the acyclic acetal is about $10^{-4} \sim 5\%$, and that of the cyclic acetal is about $10^{-2} \sim 10\%$ by weight of tetraoxane. When the initiator and/or the additive are solids at room temperature or are used in low concentration, it is advantageous to use them in the form of a solution in a solvent inactive to the initiator, the additive and formaldehyde, such as benzene or n-hexane etc. The additive can be added to the polymerization system continuously or intermittently as it is consumed instead of charging the total amount from the start of polymerization.

When an ionizing radiation or an ultraviolet light is concomitantly employed, the results are substantially the same whether irradiation is effected before or after the polymerization initiator is added to the polymerization system. In the case of in-source polymerization, a dose rate of about $10^2 \sim 10^8$ rad/hr is employed. The total dose in post-polymerization is generally about $10^2 \sim 10^8$ rad. In the case of in-source polymerization (including light irradiation), the irradiation temperature is identical with that of polymerization. In the case of post-polymerization (including light irradiation), the irradiation temperature must be within the range in which tetraoxane is in the solid state. When irradiation is carried out at a temperature higher than 60°C, in-source polymerization proceeds except for the case in which the irradiation time is very short; post-polymerization can of course be effected thereafter. Incidentally, the useful radiations include alpha rays, beta rays, gamma rays, electron beam, X-rays, neutron beam, beams of heavy particles and mixtures thereof. An ultraviolet light from a mercury lamp etc. can also be utilized.

There is no special restriction in the polymerization temperature; it is generally at about 30°~ 150°C, preferably about 60°~ 140°C; desirable results are generally obtained when polymerization is carried out at a temperature of 90°C or higher. The polymerization in solid state is preferable in order to give a product having the higher heat stability. Even when the temperature of the heating bath is higher than the melting point of tetraoxane (114°C), polymerization may proceed in the solid state during temperature raise. There is no restriction, either, with respect to the atmosphere in which the polymerization is carried out; polymerization can be carried out either in air, vacuum or an inert gas. The term "solid phase polymerization" referred to herein means polymerization carried out when tetraoxane exists in the solid state (including dispersion), and "liquid phase polymerization" means polymerization carried out when the system containing tetraoxane is in the liquid state. In-source polymerization means polymerization which proceeds during irradiation by means of an ionizing radiation or an ultraviolet light. Post-polymerization means polymerization which proceeds after irradiation in the absence of the radiation source.

After polymerization, the reaction mixture is washed with a solvent such as acetone, benzene, etc. which is a good solvent for both tetraoxane and the additives so that the produced polymer may be separated from the unreacted materials.

Now the invention is illustrated by way of working examples. These examples are included for better understanding of the invention and should not be taken as limiting the scope of the invention. The product of each of the examples is a white crystalline substance. The viscosity number $[\eta]$ is determined with respect to a solution in p-chlorophenol containing 2% α-pinene at 60°C. The thermal stability of the polymer is indicated as $K_{222}$ (%/minute) which means average thermal decomposition rate when the polymer is heated at 222°C for 1 hour under nitrogen stream. The amount of the additives is indicated in percentage on the basis of the weight of tetraoxane, unless otherwise specified.

EXAMPLE 1

A glass ampoule was charged with 1 g of tetraoxane purified by sublimation and 0.01% of a p-dioxane solution of various electron acceptors. The mixture was polymerized at 110°C for 4 hours, washed with acetone and dried, to obtain a white crystalline polymer. The results are shown in Table 1.

Table 1

| Electron Acceptor | Yield (%) | $[\eta]$ | Melting Point (°C) |
|---|---|---|---|
| nitrobenzene | 10 | 0.5 | 168 |
| m-dinitrobenzene | 41 | 0.6 | 169 |
| 1,3,5-trinitrobenzene | 75 | 0.6 | 169 |
| diphenyl picryl hydrazil | 79 | 1.7 | 168 |
| maleic anhydride | 55 | 0.9 | 165 |
| sulfur hexafluoride | 17 | 0.5 | 168 |
| none (control) | <1 | — | — |

EXAMPLE 2

A glass ampoule was charged with 1 g tetraoxane purified by sublimation and 10% of the following electron acceptor. The mixture was mechanically mixed and then polymerized for 10 minutes in 115°C bath. Tetraoxane was polymerized before its melting, although the polymerization temperature 115°C is higher than its melting point. The polymer was treated as in Example 1. The melting point of the polymer ranged between 168°~169°C. The yields were 30%, 64% and 61% respectively, when itaconic anhydride, maleic anhydride, and p-chloranil were employed.

EXAMPLE 3

Example 2 was repeated except for charging the amount of electron acceptors. The polymerization was effected in solid phase. The results are shown in Table 2.

Table 2

| | The amount added (%) | Yield (%) |
|---|---|---|
| maleic anhydride | 30 | 82 |
| " | 50 | 63 |
| " | 70 | 44 |
| p-chloroanil | 20 | 69 |
| " | 30 | 83 |

Table 2-continued

| The amount added (%) | Yield (%) |
|---|---|
| " 50 | 91 |

EXAMPLE 4

A glass ampoule was charged with 1 g tetraoxane purified by sublimation and various amounts of diphenyl picryl hydrazil, which was disolved in p-dioxane and added in the amount of 10 μl. After sealing the ampoules, the mixtures were polymerized for 4 hours in 110°C bath and then treated as in Example 1. The results are shown in Table 3.

Table 3

| Amount added (%) | Yield (%) | Viscosity $[\eta]$ |
|---|---|---|
| $10^{-4}$ | 39 | 0.7 |
| $10^{-3}$ | 53 | 0.9 |
| $10^{-2}$ | 79 | 1.7 |
| $10^{-1}$ | 43 | 1.2 |

EXAMPLE 5

Example 4 was repeated except for changing polymerization temperature. Diphenyl picryl hydrazil was employed in the amount of 0.01%. The results are shown in Table 4.

Table 4

| Bath temp. (°C) | 2 Hours polymerization | | 16 Hours polymerization | |
|---|---|---|---|---|
| | Yield (%) | $[\eta]$ | Yield (%) | $[\eta]$ |
| 105 | 13 | 1.3 | 31 | 2.1 |
| 110 | 60 | 1.5 | 80 | 2.3 |
| 130 (liquid phase) | 53 | 1.5 | 86 | 1.8 |

In the polymerization at 130°C, the polymerization system was at first in a transparent liquid phase, increased its viscosity and then separated white polymer.

EXAMPLE 6

A glass ampoule was charged with 1 g tetraoxane purified by sublimation and 0.1% of nitrogen oxide in gaseous state. After sealing the ampoule, polymerization was effected for 1 hour or 4 hours in 105°C bath. When nitrous oxide was employed, the yields were 16% for 1 hour polymerization and 34% for 4 hours. When nitrogen monooxide was employed, the yields were 12% for 1 hour and 30% for 4 hours respectively.

EXAMPLE 7

Example 1 was repeated except for employing 0.01% of tetracyanoethylene. The polymer of $[\eta] = 1.0$ was obtained in 18% yield for 1 hour polymerization at 110°C. The polymer of $[\eta] = 1.3$ was obtained in 40% yield for 4 hour polymerization at 110°C.

EXAMPLE 8 (CONTROL)

The above examples were repeated using heating baths at 55°C (solid phase) or 105°C (liquid phase) for trioxane, except for employing trioxane instead of tetraoxane. No substantial polymer was obtained.

EXAMPLE 9

A glass ampoule was charged with 1 g tetraoxane purified by sublimation and 1.0% of propionic anhydride. The ampoule was added with 0.01% of 1,3,5-trinitrobenzene (initiator) and sealed. Polymerization was effected for 4 hours in 110°C bath followed by treatment as in Example 1, to obtain a polymer of $K_{222} = 0.19$ and $[\eta] = 0.5$ in 77% yield.

EXAMPLE 10

Example 9 was repeated except for employing 0.01% of maleic anhydride as the initiator and an acetal such as methylal, 1,3-dioxolane or the mixture thereof as the additive. The results are shown in Table 5.

Table 5

| Acetal added (%) | Yield (%) | $[\eta]$ | $K_{222}$ |
|---|---|---|---|
| methylal 1.0 | 60 | 0.6 | 0.18 |
| 1,3-dioxolane 3.0 | 61 | 0.8 | 0.17 |
| methylal 1.0 and 1,3-dioxolane 2.0 | 58 | 0.6 | 0.14 |

What we claim is:
1. A process for preparing a heat-stabilized oxymethylene polymer, consisting essentially of
    polymerizing tetraoxane using as a polymerization initiator an organic nitro-compound selected from the group consisting of tetranitromethane, nitrobenzene, m-dinitrobenzene, 1,3,5-trinitrobenzene, and diphenyl picryl hydrazil,
    said nitro-compound being present in an amount of about $10^{-5}$ to 70% by weight of the tetraoxane.
2. The process of claim 1 in which said organic nitro-compound is tetranitromethane.
3. The process of claim 1 in which said organic nitro-compound is nitrobenzene.
4. The process of claim 1 in which said organic nitro-compound is m-dinitrobenzene.
5. The process of claim 1 in which said organic nitro-compound is 1,3,5-trinitrobenzene.
6. The process of claim 1 in which said organic nitro-compound is diphenyl picryl hydrazil.
7. A process of claim 1, additionally comprising the use of ionizing radiation or light, before or during the polymerization.

* * * * *